United States Patent Office 3,091,516
Patented May 28, 1963

3,091,516
PROCESS FOR THE PURIFICATION OF TELLURIUM
John B. Conn, Westfield, N.J., assignor to Merck & Co., Inc., Rahway, N.J., a corporation of New Jersey
No Drawing. Filed Nov. 25, 1960, Ser. No. 71,402
6 Claims. (Cl. 23—209)

This invention relates to elemental tellurium and more particularly to the preparation of tellurium of a high degree of purity.

Many solid state materials which have application in the electronics industry contain tellurium as an essential constituent. For example, bismuth telluride is used in cooling and power generating devices. Cadmium and zinc tellurides when properly activated have found wide applicability in computers as electroluminescent and photoconductor materials.

As electronic chemicals, it is of importance that these tellurides be of a high degree of purity, that is free of metals other than those used as activators. In a typical preparation of tellurium containing electronic chemicals a source of pure tellurium is required. For example, in the preparation of bismuth tellurides the component elements are melted together at a high temperature. Similarly, tellurides may be prepared by direct combination of the elements. In the process which involves precipitations of a metallic telluride from solution, elemental tellurium is also used as a starting material.

Accordingly, it is an object of the present invention to provide a method whereby tellurium of a high degree of purity may be prepared from impure tellurium.

A more definite object of the instant invention is to provide a process wherein tellurium is reduced with zinc in a strongly alkaline medium to a soluble zinc telluride and thereafter tellurium in a high degree of purity is precipitated from solution by the action of an oxidizing agent.

A still more specific object of this invention is to provide a process of purification of tellurium wherein tellurium is reduced with zinc in a strongly alkaline medium and thereafter precipitated in a highly purified form by the oxidizing action of chlorine.

These and other objects, features and advantages of the invention, will be apparent from the following more particular description of preferred embodiments of the invention.

What is provided herein is a process of preparing highly purified tellurium. It has been discovered that treatment of tellurium with metallic zinc in a strongly alkaline reaction medium leads to a reduction of the tellurium to telluride and formation of a solution of zinc telluride which, when an excess of zinc is employed, is formed substantially free of any metallic impurities present in the tellurium. Impurities present in the original impure tellurium either are deposited on the zinc or are precipitated from solution as tellurides. The solution is then subjected to the action of an oxidizing agent, such as chlorine, bromine, iodine or oxygen, and a precipitate of highly purified tellurium obtained thereby. The chemistry of the purification process of the present invention may be represented by the equations:

(1) 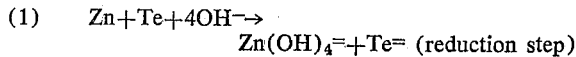
Zn+Te+4OH⁻→
Zn(OH)₄⁼+Te⁼ (reduction step)
and
(2) 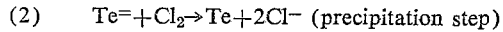 Te⁼+Cl₂→Te+2Cl⁻ (precipitation step)

The purity of the tellurium used as the starting material in the process of the present invention may vary within wide limits. In fact, one of the features of the invention is that it makes possible the production of high purity tellurium from commercial grade tellurium which contains large amounts of iron and other metals. It is preferred to charge the tellurium in powdered form to provide a large surface area for contact with the zinc. In carrying out the process, tellurium and zinc are brought together in a solution of alkali metal hydroxide. It is preferable to employ an excess of zinc over that required by the stoichiometry of the reaction for production of a solution of zinc and tellurium or required for reduction of tellurium by zinc according to Equation 1. This excess zinc reduces or converts to insoluble tellurides any contaminating heavy materials, such as iron. The amount of excess is not critical, and can be varied with good results from 1% to 100% of theory. In a preferred embodiment of the process a 40–60% excess of zinc is employed. The insoluble heavy metal impurities may be removed by filtration before precipitation of purified tellurium. As in the case of tellurium, it is desirable that the zinc be in a fine state or subdivision; it is preferred to use granulated zinc as the reducing agent.

As the alkaline reaction medium, an aqueous solution of alkali metal hydroxide of sufficient strength to solubilize the zinc telluride that is formed is used.

In a preferred embodiment of the present invention, a 35–65% aqueous solution of alkali metal hydroxide is utilized as the reaction medium, with a concentration of about 40–50% being most satisfactory. Zinc telluride has a solubility of about 1.05 moles per 1,000 grams of 11.7 molar alkali metal hydroxide. Thus, the ratio of tellurium to base at the start of the process should not exceed 1.08 moles of tellurium per thousand grams of 11.7 molar alkali metal hydroxide, (e.g., 1.05 moles of tellurium per 1,000 grams of 45% hydroxide). An alkali concentration above 35% permits the reduction of reasonable amounts of tellurium without exceeding the solubility of zinc telluride. It will, of course, be appreciated by those skilled in the art that more dilute alkali could be used satisfactorily in the process, but it would then be necessary to reduce the amount of zinc telluride produced per unit volume.

Any of the alkali metal hydroxides, such as potassium, sodium or lithium hydroxides, are suitable for practicing this novel process. However, potassium hydroxide is preferred since tellurium may then be readily recovered without risk of contamination of alkali metal salts.

The alkaline reduction discussed above is preferably carried out at elevated temperatures of about 50–80° C. although a range of about 35–100° C. may be utilized if desired. The reaction is exothermic so that the application of external heat is not normally required.

At the outset of the process polytelluride ions form as transient intermediates. These are very heavily colored, being inky purple. This color is conveniently used as a ready visual index to the course of the reaction. When the characteristic purple color substantially disappears from the solution, the reduction stage of the process is complete. The solution is then normally filtered to remove any insoluble materials, thus insuring the recovery of tellurium of high purity. Preferably the solution is passed through a glass line-filter in order to avoid contact of the alkaline solutions with organic materials such as rubber or plastic.

Recovery of purified tellurium from the alkaline mixture is brought about upon completion of the reduction. According to a preferred practice tellurium is precipitated from solution by oxidation with chlorine. Clarification is accomplished by admitting chlorine gas into the alkaline solution under vigorous stirring conditions. Finally the purified tellurium is obtained by filtering the solution upon glass, washing with dilute alkali hydroxide solution and deionized water and then with hot dilute acid solution to remove the last traces of alkali metal salts. Finally the solid tellurium is washed free of acid and dried under an inert atmosphere.

The following examples are given for purposes of illustration and not by way of limitation.

Example 1

To a 3-necked flask fitted with agitator and gas inlet is added 8 liters of 45% potassium hydroxide solution. Nitrogen is bubbled through the alkali solution which is maintained at about 80° C. To this solution is added the tellurium powder (1276 g.) (10 g.-atoms) followed by an excess of granulated zinc (785 g.-20–30 mesh). The mixture is stirred in order to keep the zinc granules in rapid motion. Within a few seconds the gray suspension changes into an inky purple solution; the heat evolution from the reaction mixture is sufficient to maintain the solution at about 80° C. The purple solution fades and disappears after about 105 minutes to give a nearly colorless solution. This solution is then filtered with nitrogen pressure onto a sintered glass filter coated with a lining of precipitated calcium carbonate into a second flask equipped with an agitator and gas inlet. Chlorine gas is then admitted at 4 cubic feet per hour and mixed with nitrogen to avoid suck-back under continuous stirring. The solution becomes purple again and evolves heat. Crystals of tellurium begin to separate in the flask and at the end of about 3 hours there is a rapid fading of color to pinkish purple at which time the solution is full of tiny glittering tellurium crystals. Chlorination is interrupted, the suspension is allowed to cool and the tellurium is collected on a sintered glass filter. The solid tellurium is pressed down, washed directly with 10% reagent potassium hydroxide in deionized water and then with deionized water. The wet mass is transferred to 2 liters of a 4 N hydrochloric solution in a 5 liter flask and agitated under nitrogen on a steam bath for 2 hours. After cooling solid tellurium is washed free from acid with deionized water, then with methanol and dried under nitrogen at 100° C. The yield of purified tellurium is 1206 g. (94.5% theoretical). A spectrographical analysis of the tellurium prepared as above shows a virtually complete absence of metallic impurities.

Example 2

The process described above was repeated using liquid bromine as the oxidizing agent to produce highly purified tellurium.

Example 3

The process described above was carried out in a similar manner using solid iodine as the oxidizing agent to provide ultra-pure tellurium.

Example 4

In a similar manner purified tellurium was prepared using oxygen as an oxidizing agent.

What has been described herein is a novel process for the preparation of elemental tellurium of a high degree of purity. The process is readily carried out on a commercial scale to provide an economical source of high purity tellurium for the manufacture of improved solid state materials and devices containing tellurium.

While the invention has been particularly shown and described with reference to preferred embodiments thereof, it will be understood by those skilled in the art that various changes in form and details may be made therein without departing from the spirit and scope of the invention.

What is claimed is:

1. A process of preparing elemental tellurium of a high degree of purity which comprises intimately contacting impure tellurium with an amount of zinc in excess of the amount of zinc required to form soluble zinc telluride in a solution of alkali metal hydroxide of sufficient strength to prevent precipitation of zinc telluride, oxidizing said telluride ion with an oxidizing agent selected from the group consisting of a halogen and oxygen to form crystals of tellurium and recovering the solid tellurium thus formed.

2. The process according to claim 1 wherein the alkali metal hydroxide is potassium hydroxide.

3. The process according to claim 1 wherein the oxidizing agent is chlorine.

4. The process of preparing elemental tellurium of a high degree of purity which comprises intimately contacting impure tellurium with an amount of zinc in excess of the amount required to form soluble zinc telluride in a solution of alkali metal hydroxide, the ratio of tellurium to base being less than 1.05 moles of tellurium per 1,000 g. of 11.7 molar alkali metal hydroxide, filtering the solution, oxidizing said telluride ion with an oxidizing agent selected from the group consisting of a halogen and oxygen to form crystals of tellurium and recovering the solid tellurium thus formed.

5. The process according to claim 4 wherein the alkali metal hydroxide is potassium hydroxide.

6. The process according to claim 4 wherein the oxidizing agent is chlorine.

References Cited in the file of this patent

FOREIGN PATENTS 786,310     Great Britain _____ Nov. 13, 1957

OTHER REFERENCES

Mellor, Comprehensive Treatise on Inorganic and Theoretical Chemistry, Longmans, Green & Co., New York, vol. XI, pages 29, 74 and 75 (1931).

Tsyb et al. in "Tsuetnye Metally," 33 No. 7, pages 61–65 (1960).